US010819242B2

United States Patent
Dai et al.

(10) Patent No.: US 10,819,242 B2
(45) Date of Patent: Oct. 27, 2020

(54) MODULAR VOLTAGE CONVERTER

(71) Applicant: Futurewei Technologies, Inc., Plano, TX (US)

(72) Inventors: Heping Dai, Plano, TX (US); Xiaolin Mao, Plano, TX (US); Dianbo Fu, Frisco, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/884,211

(22) Filed: Jan. 30, 2018

(65) Prior Publication Data

US 2019/0238059 A1 Aug. 1, 2019

(51) Int. Cl.
*H02M 3/335* (2006.01)
*H02M 1/00* (2006.01)

(52) U.S. Cl.
CPC ... *H02M 3/33569* (2013.01); *H02M 3/33576* (2013.01); *H02M 2001/0058* (2013.01); *H02M 2001/0074* (2013.01); *H02M 2001/0077* (2013.01)

(58) Field of Classification Search
CPC ......... H02M 3/33569; H02M 3/33576; H02M 2001/0058; H02M 2001/0074; H02M 2001/0077
See application file for complete search history.

(56) References Cited

U.S. PATENT DOCUMENTS

| 2005/0254272 A1* | 11/2005 | Vinciarelli | H02M 3/157 363/65 |
| 2008/0265671 A1 | 10/2008 | Uguen et al. | |
| 2014/0266131 A1 | 9/2014 | Deboy et al. | |
| 2014/0307482 A1 | 10/2014 | Chen et al. | |
| 2015/0103561 A1 | 4/2015 | Dai et al. | |
| 2016/0190943 A1* | 6/2016 | Chen | H02M 3/335 363/21.06 |

FOREIGN PATENT DOCUMENTS

| CN | 101073195 A | 11/2007 |
| CN | 104052249 A | 9/2014 |
| CN | 105191097 A | 12/2015 |

OTHER PUBLICATIONS

International Search Report dated Apr. 28, 2019, in PCT Patent Application No. PCT/CN2019/073856, 9 pages.

* cited by examiner

*Primary Examiner* — Jue Zhang
(74) *Attorney, Agent, or Firm* — Vierra Magen Marcus LLP

(57) ABSTRACT

A DC to DC voltage converter includes a first voltage converter module configurable to generate a first output at a first output voltage selected from two or more different voltages and a second voltage converter module configurable to generate a second output at a second output voltage selected from two or more different voltages. The first voltage converter module and the second voltage converter module have a common input. A common output combines the first output voltage from the first voltage converter module and the second output voltage from the second voltage converter module.

20 Claims, 11 Drawing Sheets

MODULAR VOLTAGE CONVERTER

FIELD

The following is related generally to the field of DC to DC converters and, more specifically, to resonant converters.

BACKGROUND

Resonant converters are a type of DC to DC electric power converter that include a network of inductors and capacitors tuned to resonate at a particular frequency. A resonant converter may need to handle a wide range of input voltages and a wide range of output voltages.

FIG. 1 shows an example of an LLC resonant DC to DC converter 100 of the prior art. A direct current (DC) input voltage, Vin, is provided to a switching network 102 (including switches Q1, Q2, Q3, and Q4) that provides a switched output, e.g. an alternating current (AC) output, to a combination of inductors, Lr and Lm, and a capacitor, Cr. These are connected to the primary side of a transformer 104 with transformer ratio m:n (i.e. the ratio of the number of windings on the primary side to the secondary side, also known as the winding ratio, is m:n). The secondary side of the transformer 104 is connected to a rectifier 106 that includes switches Q5, Q6, Q7, and Q8. Rectifier 106 provides an output voltage, Vout, to a load, represented as a resistive load, $R_L$ with an output capacitor Co connect in parallel. In general, such DC to DC transformers are efficient in a frequency range near a resonant frequency and are inefficient at other frequencies.

SUMMARY

According to one aspect of the present disclosure, there is provided a DC to DC voltage converter that includes: a first voltage converter module configurable to generate a first output at a first output voltage selected from two or more different voltages; a second voltage converter module configurable to generate a second output at a second output voltage selected from two or more different voltages; a common input to the first voltage converter module and the second voltage converter module; and a common output combining the first output voltage from the first voltage converter module and the second output voltage from the second voltage converter module.

Optionally, in any of the preceding aspects, another implementation of the aspect provides that the common input is provided to the first voltage converter module and the second voltage converter module in series and the common output combines the first output voltage from the first voltage converter module and the second output voltage from the second voltage converter module in parallel.

Optionally, in any of the preceding aspects, another implementation of the aspect provides that the common input is provided to the first voltage converter module and the second voltage converter module in parallel and the common output combines the first output from the first voltage converter module and the second output from the second voltage converter module in series.

Optionally, in any of the preceding aspects, another implementation of the aspect provides that the first voltage converter module includes a bridge and is configurable by controlling elements of the bridge.

Optionally, in any of the preceding aspects, another implementation of the aspect provides that the elements of the bridge are configurable in three modes: a rectifying mode for generating the first output voltage at a voltage equal to an alternating current input, a voltage-doubling mode for generating the first output voltage at a voltage equal to two times the alternating current input, and a shorted mode for generating the first output voltage at substantially zero volts.

Optionally, in any of the preceding aspects, another implementation of the aspect provides that the first voltage converter module contains a first transformer with a first ratio and the second voltage converter module contains a second transformer with a second ratio.

Optionally, in any of the preceding aspects, another implementation of the aspect provides that the first transformer and the second transformer are formed by different secondary windings of a common core having a primary winding coupled to a resonant circuit.

Optionally, in any of the preceding aspects, another implementation of the aspect provides at least one of an LLC, LCLC, LCC, full bridge, half bridge, Dual Active Bridge (DAB), or Multi-Level (ML) circuit.

Optionally, in any of the preceding aspects, another implementation of the aspect provides that at least a third voltage converter module is configurable to generate at least a third output at a third output voltage selected from two or more different voltages, the common input is provided to the third voltage converter module, and the common output combines the at least a third output voltage with the first output voltage and the second output voltage.

According to one aspect of the present disclosure, there is provided a DC to DC voltage conversion system that includes: a plurality of voltage converter modules, an individual voltage converter module having a module input connected to a primary winding of a transformer, with a secondary winding of the transformer connected through a configurable bridge to a module output; a primary circuit connected to provide an alternating current to module inputs of the plurality of voltage converter modules; and a system output that combines individual output voltages from module outputs of the plurality of voltage converter modules.

Optionally, in any of the preceding aspects, another implementation of the aspect provides that each voltage converter module of the plurality of voltage converter modules contains a transformer with a different transformer ratio.

Optionally, in any of the preceding aspects, each voltage converter module has a configurable bridge configurable to rectify alternating current from a corresponding secondary winding to generate a DC output at either a secondary winding waveform voltage or at two times the secondary winding waveform voltage.

Optionally, in any of the preceding aspects, the primary circuit provides the alternating current to module inputs of the plurality of voltage converter modules in series and the system output combines individual output voltages from module outputs of the plurality of voltage converter modules in parallel.

Optionally, in any of the preceding aspects, the primary circuit provides the alternating current to module inputs of the plurality of voltage converter modules in parallel and the system output combines individual output voltages from module outputs of the plurality of voltage converter modules in series.

According to one aspect of the present disclosure, there is provided a method of generating a DC output voltage from a DC input voltage that includes: generating a primary waveform of a primary voltage from the DC input voltage; transforming the primary waveform of the primary voltage through a first transformer to obtain a secondary waveform of a first voltage; rectifying the secondary waveform of the first voltage through a first configurable bridge to provide a first DC output; transforming the primary waveform of the primary voltage through a second transformer to obtain a secondary waveform of a second voltage; rectifying the secondary waveform of the second voltage through a second configurable bridge to provide a second DC output; and combining the first DC output and the second DC output.

Optionally, in any of the preceding aspects, the method further includes configuring the first configurable bridge to provide the first DC output at either the first voltage, at a voltage two times the first voltage, or at substantially zero volts; and configuring the second configurable bridge to provide the second DC output at either the second voltage, at a voltage two times the second voltage, or at substantially zero volts.

Optionally, in any of the preceding aspects, combining the first DC output and the second DC output includes combining the first DC output and the second DC output in series.

Optionally, in any of the preceding aspects, combining the first DC output and the second DC output includes combining the first DC output and the second DC output in parallel.

Optionally, in any of the preceding aspects, the method further includes reconfiguring at least one of the first configurable bridge and the second configurable bridge to change at least one of the first DC output and the second DC output without substantially modifying the primary waveform of the primary voltage.

Optionally, in any of the preceding aspects, the method may further include maintaining the primary waveform of the primary voltage in a predetermined frequency range during the reconfiguring, the predetermined frequency range including a resonance frequency of a resonant circuit generating the primary waveform.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

The following presents some examples of DC to DC resonant converters that are configurable to provide a wide range of output voltages while operating in a frequency range that provides high efficiency (e.g. at or near resonant frequency). An arrangement of modules that are individually and collectively configurable allows an output voltage to be selected from a range of output voltages available for a given input voltage without modifying frequency or duty cycle of an AC input to a resonant component, thus maintaining a high efficiency over a range of output voltages. Different voltage conversion ratios also allow a wide range of input voltages to be accommodated without modifying frequency or duty cycle.

Figure 1:
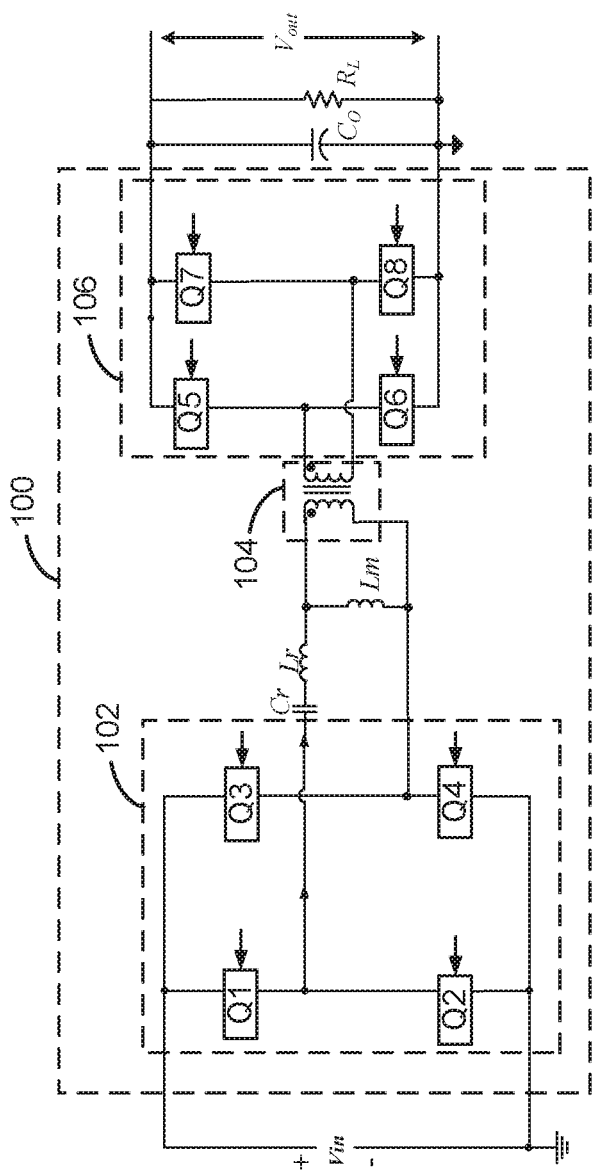
FIG. 1 shows an example of a DC to DC converter of the prior art.
Figure 2A:
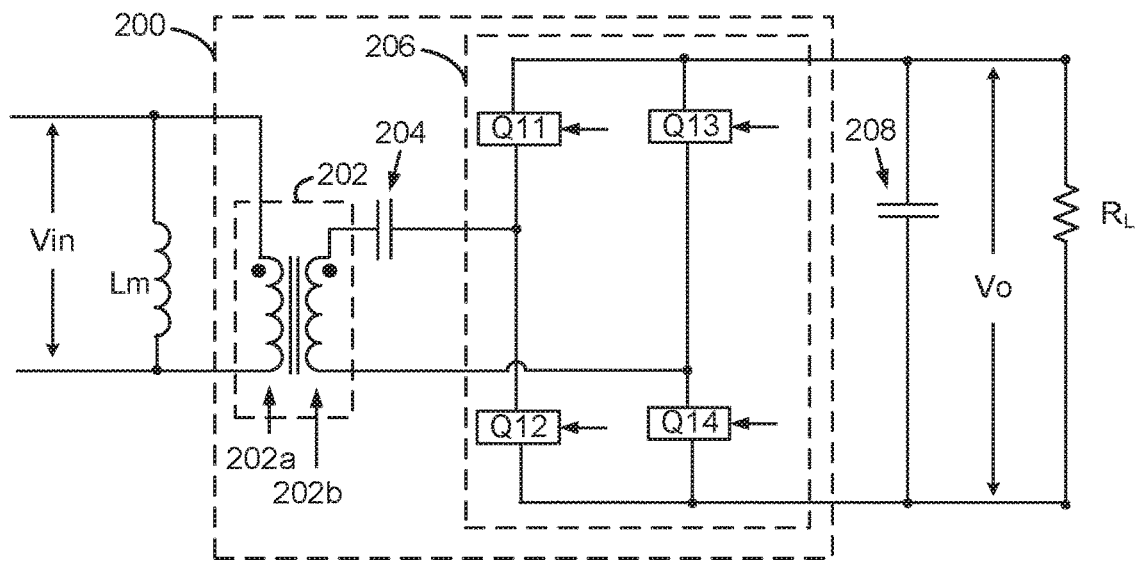
FIGS. 2A-C illustrate aspects of an embodiment of a modular voltage converter.

FIG. 2A shows an example of a configurable module or cell, module 200, that is individually configurable to provide different output voltages in different configurations. An AC input voltage Vin is provided to a primary winding 202a of a transformer 202 (e.g. a high-frequency transformer). For example, Vin may be provided by an LLC circuit as shown in FIG. 1, and inductor Lm may be a component of such a system (e.g. one inductor in a combination of two inductors and a capacitor in an LLC arrangement). While inductor Lm is shown as a separate component in FIG. 2A, it will be understood that transformer 202 provides magnetizing inductance and that inductor Lm may partially, or entirely provided by transformer 202 (i.e. there may be no separate inductor component). The secondary winding 202b of transformer 202 is connected through a capacitor 204 (a DC blocking capacitor) to a switching network or bridge 206 that includes four elements Q11, Q12, Q13, and Q14 connected as illustrated. Elements of a switching network or bridge such as bridge 206 may be active or passive components depending on configuration, for example, in some configurations, switches such as MOSFETs or IGBTs may be used as one or more elements of a bridge. In some configurations, diodes may be used as one or more elements of a bridge. By appropriately configuring elements of bridge 206 (e.g. by applying appropriate voltages to change components between on and off states), different voltage outputs may be generated from any given input (i.e. different values of Vo from a given value of Vin). The output of bridge 206, voltage Vo, is provided to a load, herein represented by a resistor, $R_L$, and capacitor 208, which is connected across the output. An output capacitor such as capacitor 208 may be considered as a component of a module in some configurations and each such module may have a dedicated capacitor, while in other configurations an output capacitor may be shared between modules.

Two or more modules, such as module 200, may be combined in various configurations in a modular voltage converter. Modules may be identical in such an arrangement, or may be different in one or more ways, for example, different transformer ratios may be provided in different modules (e.g. ratio of windings in the primary winding to the secondary winding, or m:n, may be different for different modules).

Figure 2B:
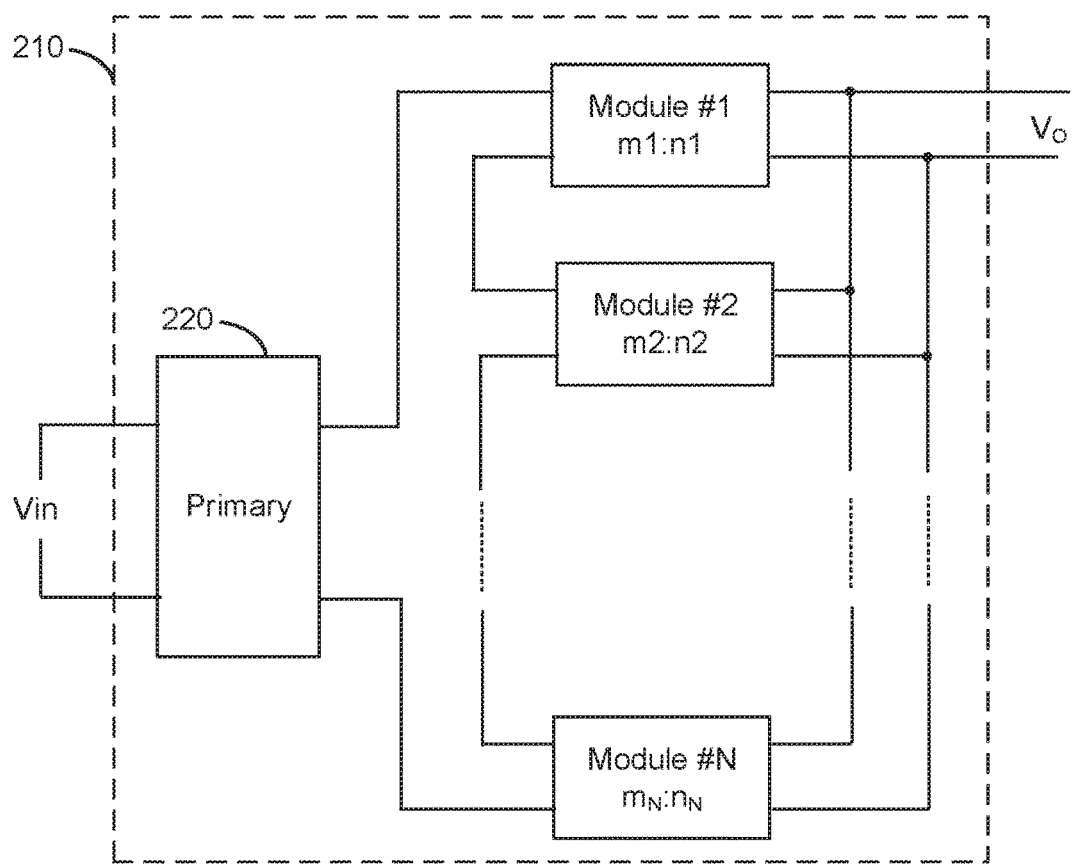

FIG. 2B shows an example of N modules (Module #1, Module #2 . . . Module # N) that are connected together to form a modular voltage converter 210. Each module may be substantially as illustrated in FIG. 2A with transformers of different modules having different transformer ratios as indicated, e.g. Module #1 has transformer ratio m1:n1, Module #2 has transformer ratio m2:n2, and so on. Inputs of Modules #1 to # N are connected in series while outputs of Modules #1 to # N are connected in parallel to produce an output voltage Vo.

A primary circuit 220 of modular voltage converter 210 is connected to the series-connected Modules #1 to # N. Primary circuit 220 receives an input voltage, Vin, and may generate an output such as a square wave, AC voltage, or other such waveform. Primary circuit 220 may include an LLC resonant tank as previously shown, or may be formed as a primary circuit of any suitable isolated converter technology, including, for example, LCLC (with an inductor and capacitor in series with primary winding and another capacitor and inductor in parallel with secondary winding), LCC (an inductor and capacitor in series with primary winding and another capacitor in parallel with the primary winding), ML (multi-level), a full bridge, a half bridge, DAB (dual active bridge), or some other suitable arrangement to produce a waveform from DC input voltage Vin.

Figure 2C:
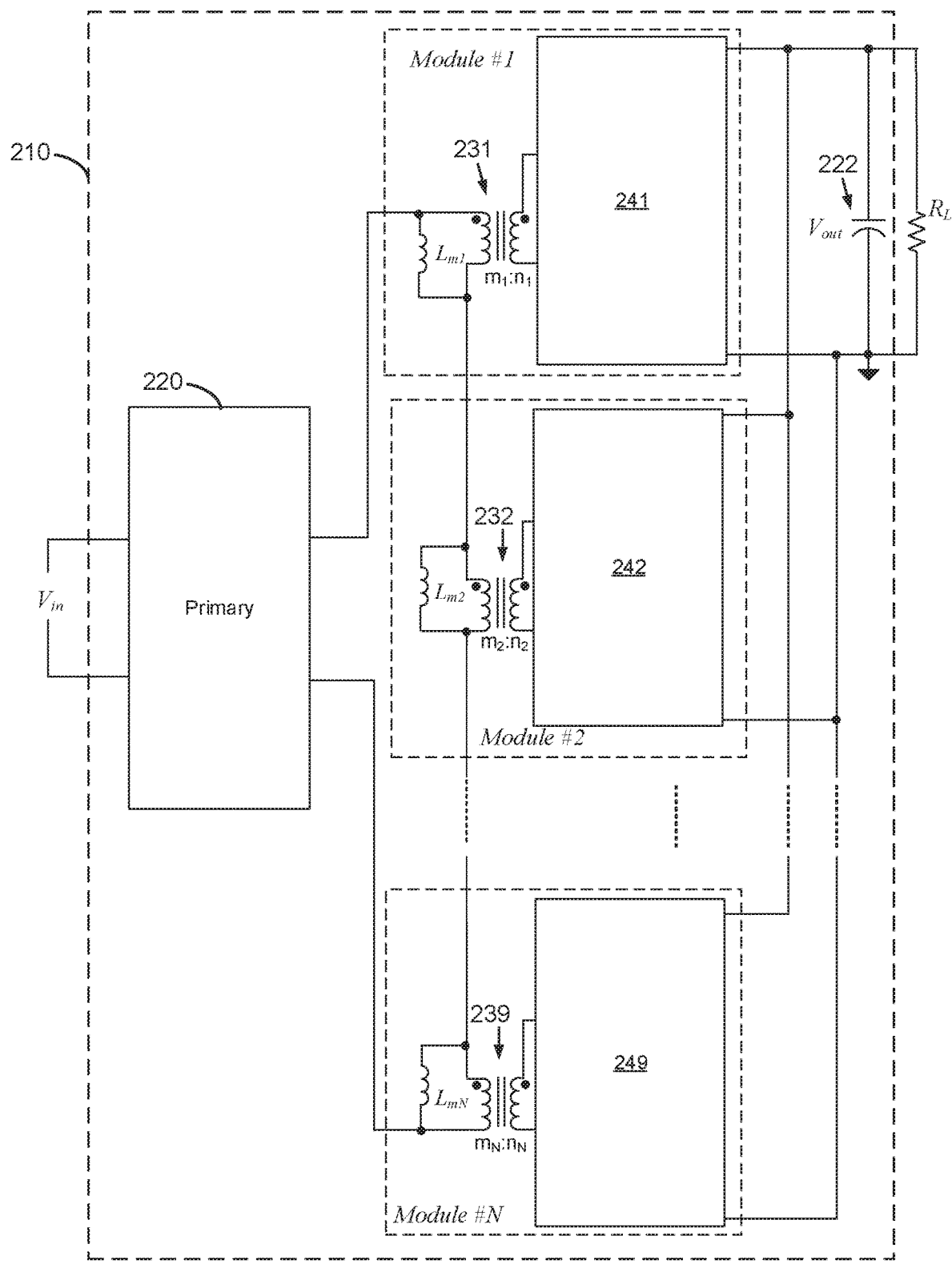

FIG. 2C shows a more detailed example of an implementation in which details of individual modules (including Module #1, Module #2 . . . Module # N) of modular voltage converter 210 are simplified to omit details of switching networks. Thus, in Module #1, inductor Lm1, transformer 231 and switching network 241 are shown (omitting details of switching network 241), in Module #2, inductor Lm2, transformer 232 and switching network 242 are shown, and in Module # N, inductor LmN, transformer 239 and switching network 249 are shown. Serial connection of transformers 231, 232, 239 is illustrated. Transformer ratios of transformers 321, 232, and 239 are respectively m1:n1, m2:n2, and mN:nN. In this example, bridge elements may be implemented as MOSFETs with anti-parallel diodes or otherwise. Capacitor 222 is shared by modules #1 to # N and is connected across the output voltage, Vout, i.e. in parallel with the load, shown as a resistive load, $R_L$. As modules #1 to # N are connected in parallel at their output side, a single capacitor 222 may be used in this configuration as an alternative to including a separate capacitor in each module.

Figure 3A:
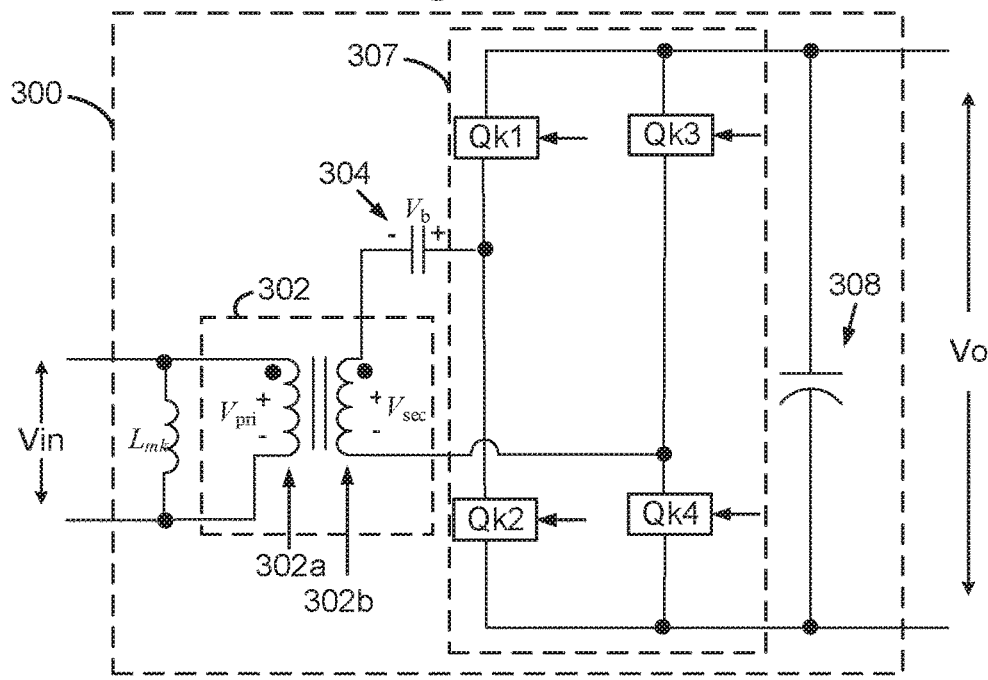
FIGS. 3A-D illustrate aspects of an embodiment of an individual module.

Operation of an individual configurable module, such as any given one of Modules #1 to # N of FIGS. 2A-2C will now be described. FIG. 3A illustrates an example configuration of an individual module, module 300, that is configurable to provide three different voltage outputs from a given voltage input Vin. Transformer 302 receives an AC voltage Vpri to its primary winding 302a and generates output voltage Vsec on its secondary winding 302b. Capacitor 304 is connected to one terminal of transformer 302 and has a voltage Vb across its dielectric. Bridge elements Qk1 Qk2, Qk3, and Qk4 of switching network 307 may be metal-oxide-silicon field-effect transistors (MOSFETs) coupled with anti-parallel diodes and thus may be actively driven. In some cases, MOSFETs may not be driven, or may be replaced by other components, such as diodes, that are passive.

Figure 3B:
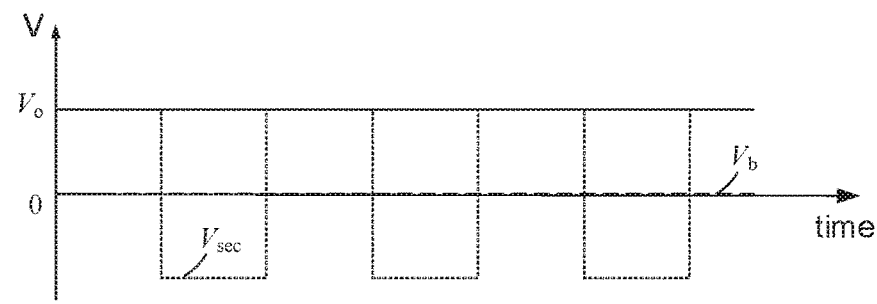

In a first configuration illustrated in the output voltage versus time plot of FIG. 3B, elements Qk1, Qk2, Qk3, and Qk4 form a rectifier circuit and may be passive or active (e.g. synchronous rectification). In one example, elements Qk1, Qk2, Qk3, and Qk4 are operated as diodes (e.g. using anti-parallel diodes with transistors turned off) in what may be considered full-bridge mode. The voltage on the secondary winding 302b, Vsec, is shown as a square wave AC input that is provided as an input to bridge elements Qk1, Qk2, Qk3 and Qk4 and is rectified to produce a DC output at a voltage Vo that is equal in magnitude to the amplitude of Vsec. The voltage across capacitor 304, Vb, remains at zero in this mode. It will be understood that the voltage of the secondary winding 302b, Vsec, is related to the voltage of the primary winding 302a, Vpri, according to the transformer ratio (here $m_k:n_k$, where k may be from 1 to N depending on the module) and thus Vo is also a function of the ratio $m_k:n_k$ for a given AC input to module 300, i.e. Vo=$(n_k:m_k)$*Vpri.

Figure 3C:
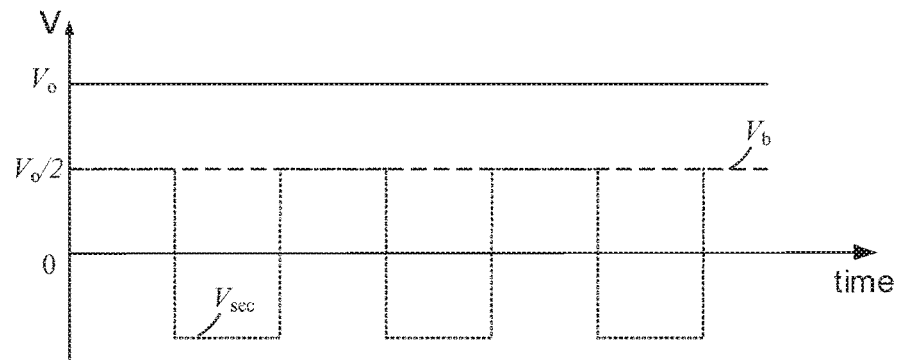

In a second configuration illustrated in the output voltage versus time plot of FIG. 3C, elements Qk1, Qk2, Qk3 and Qk4 of switching network 307 form a voltage-doubling circuit to generate a DC output voltage Vo that is two times Vsec, i.e. two times the AC input voltage to the bridge 307. One example of configuring module 300 as a voltage-doubling circuit is by shorting one element while the other element on the same leg is open, e.g. shorting element Qk4 while element Qk3 is open. This generates a DC voltage Vb across capacitor 304 that is equal in voltage to the amplitude of AC input to the bridge, Vsec, and in turn produces an output voltage Vo that is twice the amplitude of Vsec. This may be considered a voltage-doubling mode for generating an output voltage at a voltage equal to two times the alternating current input. It will be understood that the voltage of the secondary winding Vsec is related to the voltage of the primary winding Vpri according to the ratio mk:nk and thus Vo is also a function of the ratio mk:nk for a given AC input to module 300, i.e. Vo=2(nk:mk)*Vpri.

Figure 3D:

In a third configuration illustrated in the output voltage versus time plot of FIG. 3D, elements of module 300 are configured to produce a zero-volt output, i.e. Vo=0 as shown. Two elements may be shorted to connect both sides of the secondary winding together while the other two elements may be open, e.g. top elements Qk1 and Qk3 shorted while bottom elements Qk2 and Qk4 are open, or vice versa. This may be considered a shorted mode for generating the output voltage at substantially zero volts. The output voltage Vo=0 regardless of transformer ratio in this mode. In general, this mode is used when a module is connected in series with other modules that are in other modes (e.g. a module may be in shorted mode when other modules generate adequate voltage for a particular application).

Any number of configurable modules such as module 300 may be connected together to form a modular voltage converter (e.g. N modules of FIG. 2B) and for any given number of such modules, various configurations are possible. For simplicity, two-module examples will now be described with respect to FIGS. 4A-B. However, it will be understood that the technology illustrated can be extended to three or more modules in a variety of configurations.

Figure 4A:
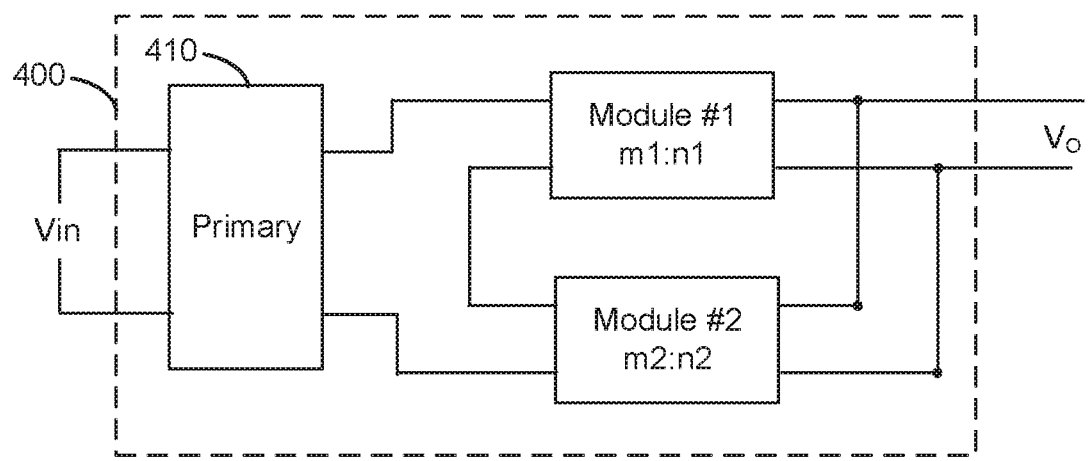
FIGS. 4A-B illustrate different embodiments with different configurations of modules.

FIG. 4A illustrates a modular voltage converter 400 that includes two modules, module #1 and module #2, with inputs connected in series. A primary circuit 410 provides an input to module #1 and module #2, for example a waveform such as a square wave or other AC input. Outputs of module #1 and module #2 are connected in parallel to generate output voltage Vo. Module #1 has a transformer ratio $m_1:n_1$ while module #2 has a transformer ratio m2:n2 that is different. Each module may be configured in at least the three modes described above with respect to module 300. This provides a total of nine different configurations, however, shorting both modules is generally not a useful mode. For any given input voltage Vin, at least eight different output voltages Vo may be provided depending on configuration of modules. The ratio of Vo to Vin may be as indicated in the following table:

| Module #1 mode | Module #2 mode | Ratio Vo/Vin |
|---|---|---|
| Full-bridge | Shorted | $n_1/m_1$ |
| Shorted | Full-bridge | $n_2/m_2$ |
| Voltage-doubling | Shorted | $2n_1/m_1$ |
| Shorted | Voltage-doubling | $2n_2/m_2$ |
| Full-bridge | Full-bridge | $n_1 * n_2/(m_1 * n_2 + m_2 * n_1)$ |
| Voltage-doubling | Voltage-doubling | $2n_1 * n_2/(m_1 * n_2 + m_2 * n_1)$ |

-continued

| Module #1 mode | Module #2 mode | Ratio Vo/Vin |
| --- | --- | --- |
| Voltage-doubling | Full-bridge | $2n_1 * n_2/(m_1 * n_2 + 2m_2 * n_1)$ |
| Full-bridge | Voltage-doubling | $2n_1 * n_2/(2m_1 * n_2 + 2m_2 * n_1)$ |

Thus, for example, for an input voltage of one volt (Vin=1 volt) and transformer ratios of module #1 and module #2 of 2:2 and 3:2 respectively (i.e. $m_1:n_1=2:2$ and $m_2:n_2=3:2$) the following table shows the range of output voltages Vo that may be produced by different configurations of module #1 and module #2 in modular voltage converter 400:

| Module #1 mode | Module #2 mode | Vo (volts) |
| --- | --- | --- |
| Full-bridge | Shorted | 0.4 |
| Shorted | Full-bridge | 0.5 |
| Voltage-doubling | Shorted | 0.5714 |
| Shorted | Voltage-doubling | 0.6667 |
| Full-bridge | Full-bridge | 0.8 |
| Voltage-doubling | Voltage-doubling | 2.0 |
| Voltage-doubling | Full-bridge | 1.3333 |
| Full-bridge | Voltage-doubling | 1.0 |

Thus, by configuring modules appropriately, output voltage can be varied between 0.4 volts and 2.0 volts while maintaining the same AC waveform, which may provide high efficiency.

Figure 4B:
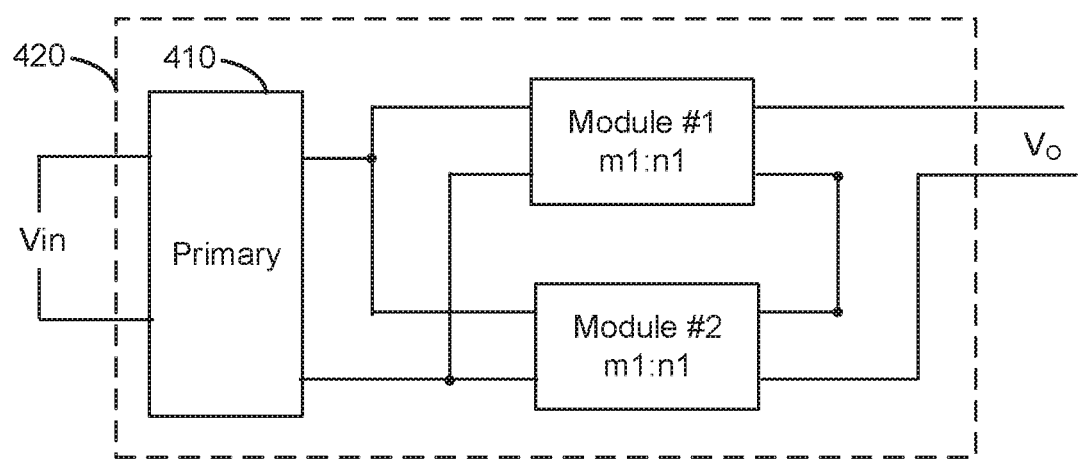

An example of an alternative configuration of module #1 and module #2 is shown in modular voltage converter 420 of FIG. 4B. In this configuration, inputs of module #1 and module #2 are connected in parallel (connected to output of primary circuit 410) while outputs of module #1 and module #2 are connected in series to generate Vo. As in the example of FIG. 4B, each module has three different modes, full-bridge, voltage-doubling, and shorted. Because inputs of modules are connected in parallel, shorting either module is generally not desirable. Thus, of the nine possible configurations, four combinations are generally useful. Outputs for these combinations are illustrated in the following table:

| Module #1 mode | Module #2 mode | Ratio Vo/Vin |
| --- | --- | --- |
| Full-bridge | Full-bridge | $n_1/m_1 + n_2/m_2$ |
| Voltage-doubling | Voltage-doubling | $2n_1/m_1 + 2n_2/m_2$ |
| Voltage-doubling | Full-bridge | $2n_1/m_1 + n_2/m_2$ |
| Full-bridge | Voltage-doubling | $n_1/m_1 + 2n_2/m_2$ |

Thus, for example, for an input voltage of one volt (Vin=1 volt) and transformer ratios of module #1 and module #2 of 2:2 and 3:2 respectively (i.e. m1:n1=2:2 and m2:n2=3:2) the following table shows the range of output voltages Vo that may be produced by different configurations of module #1 and module #2 in modular voltage converter 420:

| Module #1 mode | Module #2 mode | Vo (volts) |
| --- | --- | --- |
| Full-bridge | Full-bridge | 1.6667 |
| Voltage-doubling | Voltage-doubling | 3.3333 |
| Voltage-doubling | Full-bridge | 2.6667 |
| Full-bridge | Voltage-doubling | 2.3333 |

Thus, modular voltage converter 420 can provide four different output voltages while maintaining the same AC waveform, which may provide high efficiency.

While the above examples show implementations that focus on the secondary side of transformers, other implementations focus on the primary side of transformers. Configurable modules may be connected in various arrangements on the primary side with a secondary circuit that may, or may not, be configurable.

Figure 5A:
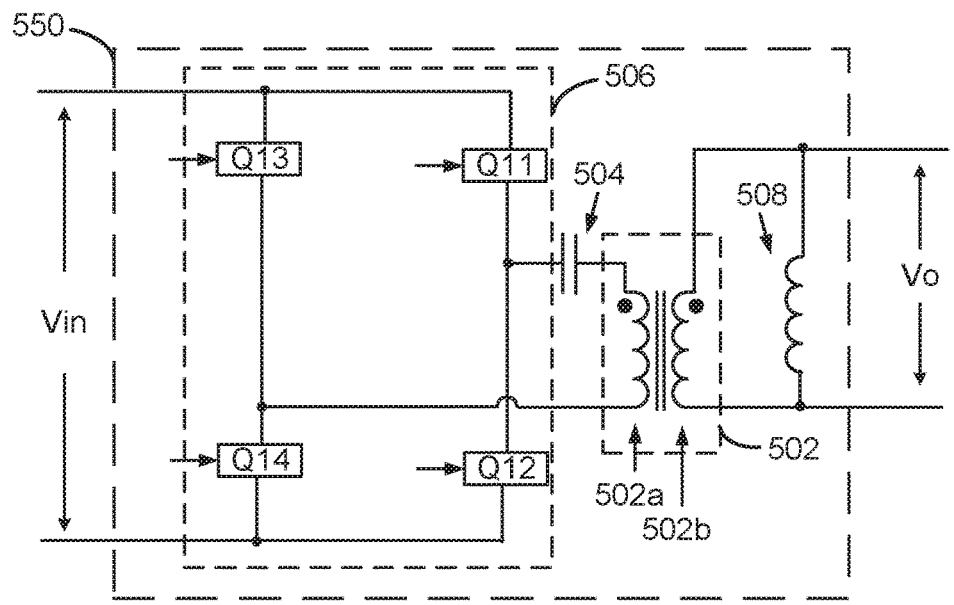
FIGS. 5A-C illustrate an embodiment that includes multiple modules on the primary side of a modular voltage converter.
Figure 5B:
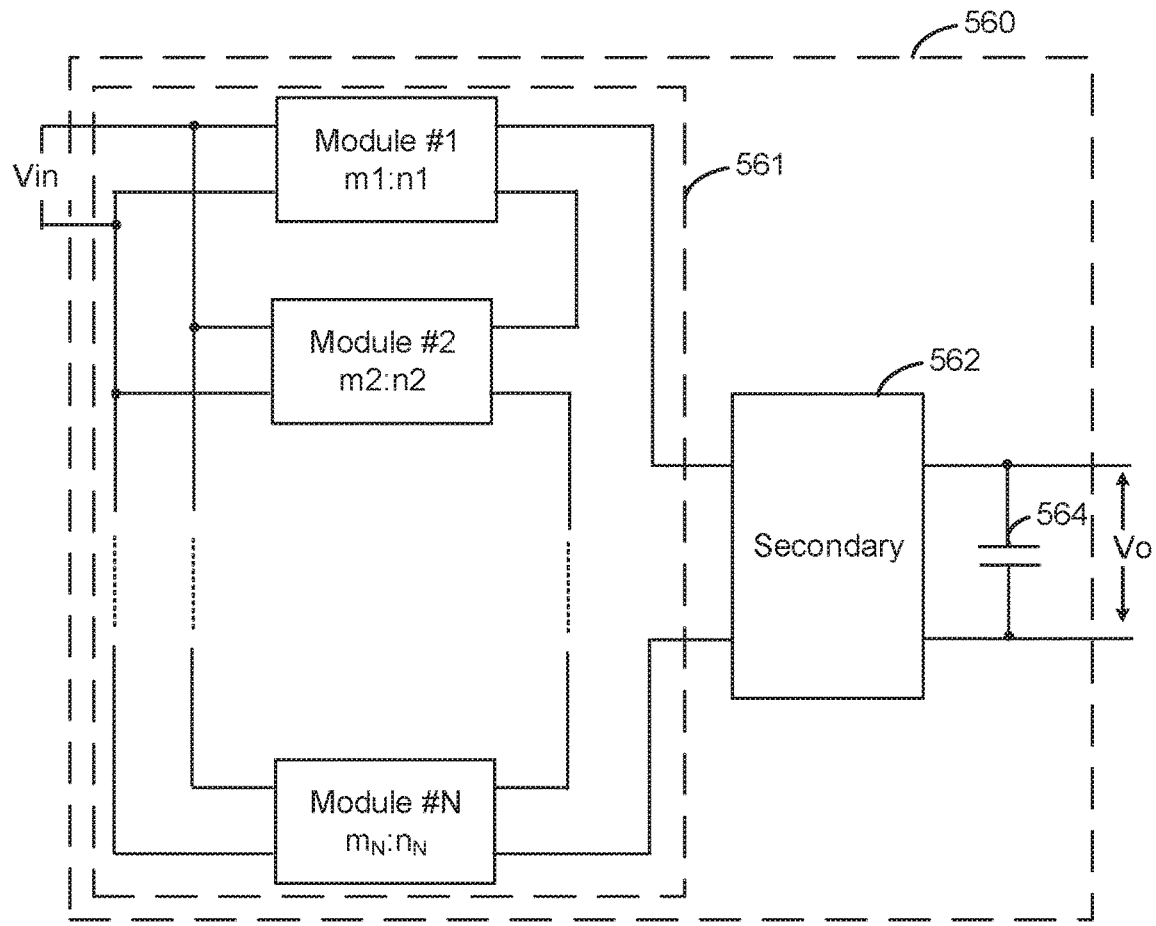

FIGS. 5A-B show an example of how a modular voltage converter may be implemented by using multiple modules on the primary side (rather than on the secondary side as illustrated, for example, in FIGS. 2B, 4A, and 4B).

FIG. 5A illustrates an example of a configurable module 550 that is adapted for implementation on the primary side of a modular voltage converter (i.e. in circuits providing AC input to a transformer of the modular voltage converter). A DC input voltage Vin is provided to a bridge 506, which contains elements Q11, Q12, Q13, and Q14 (which may be MOSFET transistors or other switching components). By appropriately configuring elements of bridge 506, different AC voltage outputs may be generated and provided to a transformer 502 from any given input (i.e. from a given value of Vin different AC voltages may be applied to primary winding 502a of transformer 502). For example, both legs of bridge 506 may be active (i.e. both performing high frequency switching, e.g. in a frequency range that includes a resonant frequency, for example, between +20% and −10% of a resonant frequency) to provide a waveform with amplitude Vin, or one leg may provide a fixed voltage by shorting one element and leaving one element open (e.g. Q11 shorted while Q12 open) while the other leg is active (e.g. elements Q13 and Q14 perform high speed switching) to provide a waveform with amplitude Vin/2. The secondary winding 502b of transformer 502 is connected in parallel with an inductor 508 to provide output voltage Vo. The transformer ratio may be selected for a given module (i.e. different modules may have different transformer ratios). Output voltage Vo may be provided to a secondary circuit along with outputs from one or more other modules FIG. 5B illustrates an example of N modules, Module #1 to Module # N, forming a primary side 561 of modular voltage converter 560, where any individual module (i.e. any of Module #1 to Module # N) may be implemented as illustrated in FIG. 5A. Thus, in this example, input voltage Vin is provided to modules #1 to # N in parallel and outputs of modules #1 to # N are connected in series and are connected to the input of secondary circuit 562, which may be a secondary circuit of any isolated topology (e.g. LLC, LCLC, LCC, full-bridge, half-bridge, DAB, ML, or other such circuit). A capacitor 564 is provided across the output of secondary circuit 562, which provides a DC output voltage Vo.

Figure 5C:
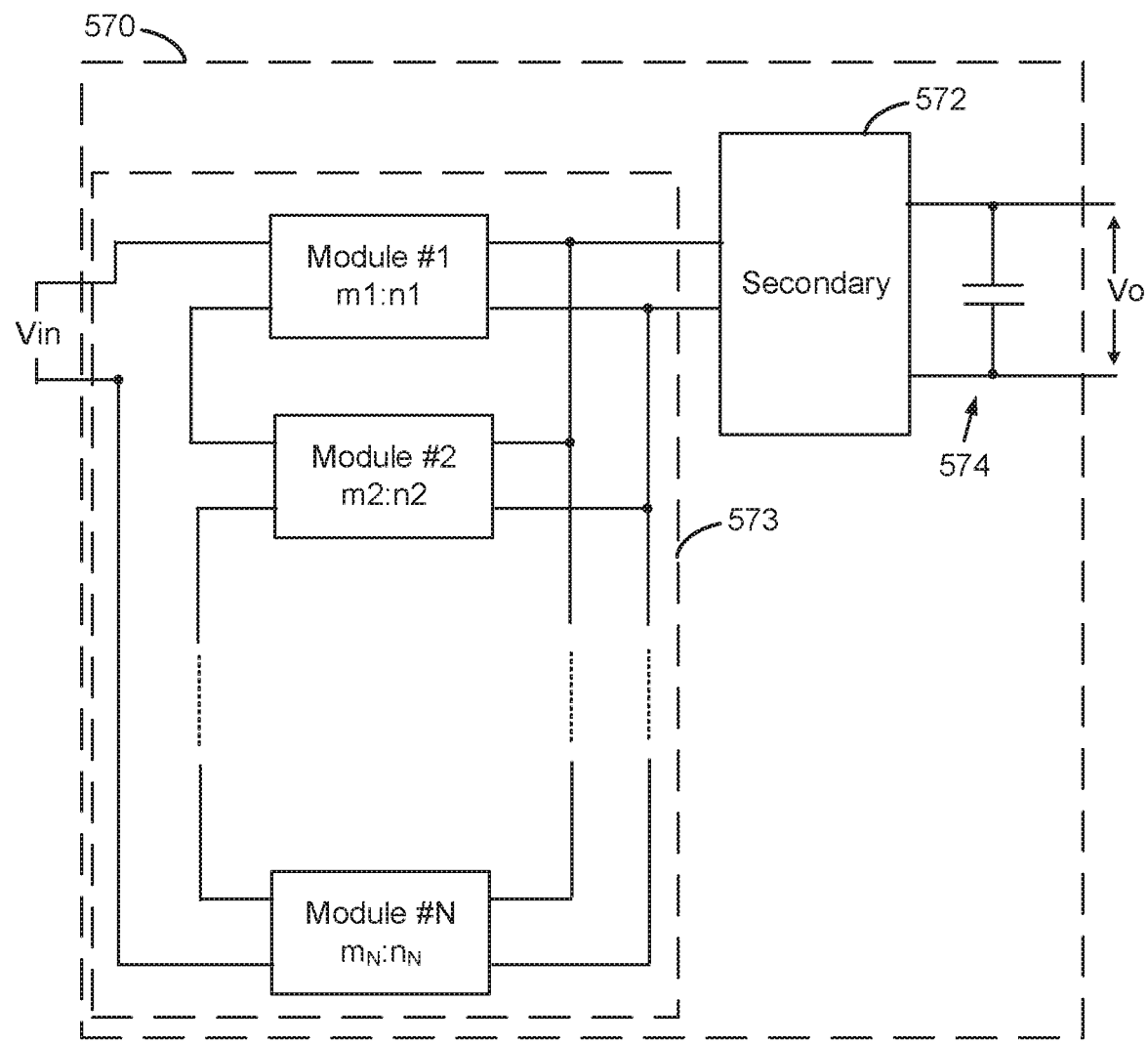

FIG. 5C illustrates another example of a modular voltage converter 570 where modules are implemented on the primary side 573 of modular voltage converter 570. In this case inputs of modules Module #1 to Module # N are connected in series and outputs are connected in parallel (unlike FIG. 5B where inputs were connected in parallel and outputs were connected in series). Parallel outputs are coupled to secondary circuit 572, which provides a DC output voltage Vo, with capacitor 574 connected across the output. In general, when configuring multiple modules, modules are connected in parallel at one side (input or output) and are connected in series at the other side (output or input). For example, in series at the input side and in parallel at the output side as in FIG. 5C or in parallel at the input side and in series at the output side as in FIG. 5B.

In some arrangements, modules may share one or more components. For example, where modules are connected in parallel on the secondary side of a modular voltage converter, two or more modules may share transformer components, for example, by sharing the same primary winding and transformer core, with each module having an individual secondary winding so that each module may have a different transformer ratio.

Figure 6A:
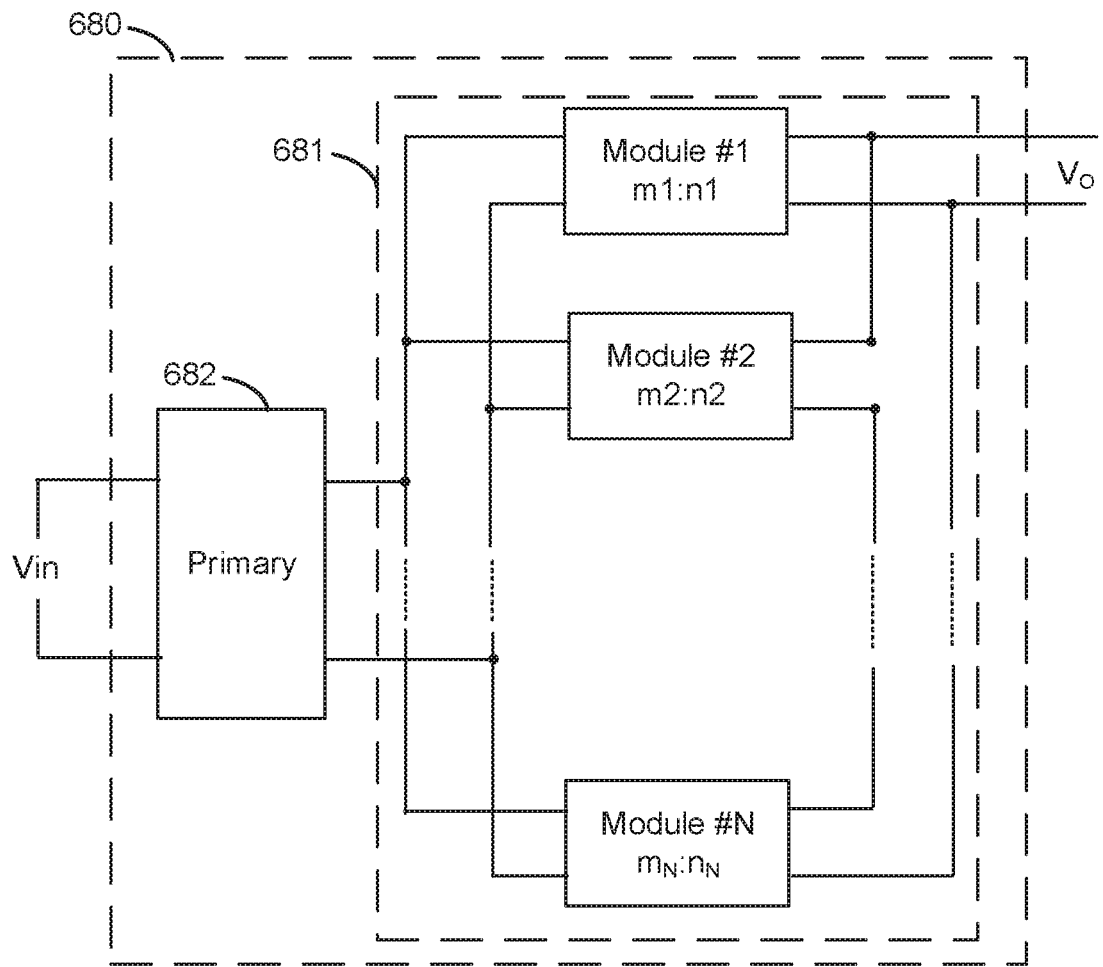
FIGS. 6A-B illustrate an embodiment that includes modules coupled to a common transformer core.

FIG. 6A shows an example of N modules, Module #1 to Module # N, that are connected on the secondary side 681 of modular voltage converter 680. Inputs of Module #1 to Module # N are connected in parallel to the output of primary circuit 682 while outputs of Module #1 to Module # N are connected in series. Primary circuit 682 may include LLC, LCLC, LCC, full-bridge, half-bridge, DAB, ML, or other configurations. Some components, such as some transformer elements may be shared in modular voltage converter 680.

Figure 6B:
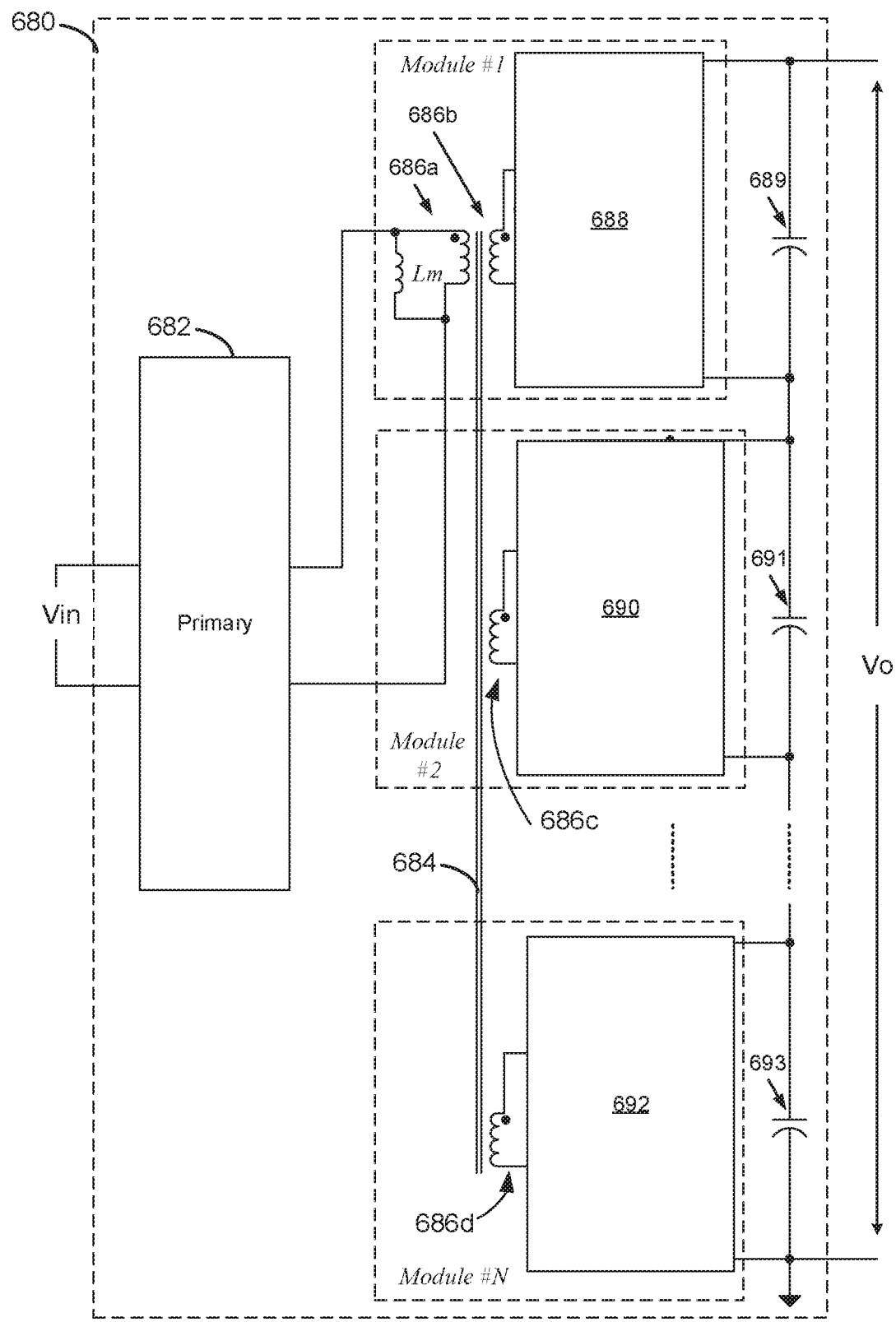

FIG. 6B illustrates some details of Module #1 to Module # N including shared components of Module #1 to Module # N of modular voltage converter 680. In particular, a shared transformer core, core 684, extends through Modules #1, Module #2 . . . to # N (where N may be any number) and secondary windings of each module are coupled to core 684. In module #1, a primary winding 686*a* and a secondary winding 686*b* are coupled by core 684 with a transformer ratio of m:$n_1$, i.e. the ratio of the number of turns in primary winding 686*a* to secondary winding 686*b* is m:$n_1$. Secondary winding 686*b* is connected to switching network 688, which is connected to output capacitor 689. In module #2, a secondary winding 686*c* is coupled to core 684 with a transformer ratio of m:$n_2$, where n2 may be different to n1. Thus, a different secondary voltage may be generated in modules #1 and #2. Secondary winding 686*c* is connected to switching network 690, which is connected to output capacitor 691. In module # N, a secondary winding 686*d* is coupled to core 684 with a transformer ratio m:nN, where nN may be different to n1 and/or n2. Thus, a different secondary voltage may be generated in one or more of modules #1, #2 . . . # N. Secondary winding 686*d* is connected to switching network 692, which is connected to output capacitor 693. Output capacitors 689, 691 and 693 are connected in series to generate an output voltage Vo. Other modules may have other transformer ratios. Rather than using separate discrete transformers in each module as illustrated in FIG. 2C, here, a single primary winding and core with separate secondary windings may provide similar functionality. It will be understood that a shared primary winding and core may be implemented in modular voltage converter 680 where modules are coupled in parallel. In contrast, in FIG. 2C, modules are coupled in series. A core may also be shared by multiple modules on the primary side, e.g. multiple primary windings and a single secondary winding coupled to a shared core. For example, in the configuration of FIG. 5B above, Module #1 to Module # N may include individual windings coupled to a shared core and secondary circuit 562 may also be coupled to the core).

Figure 7:
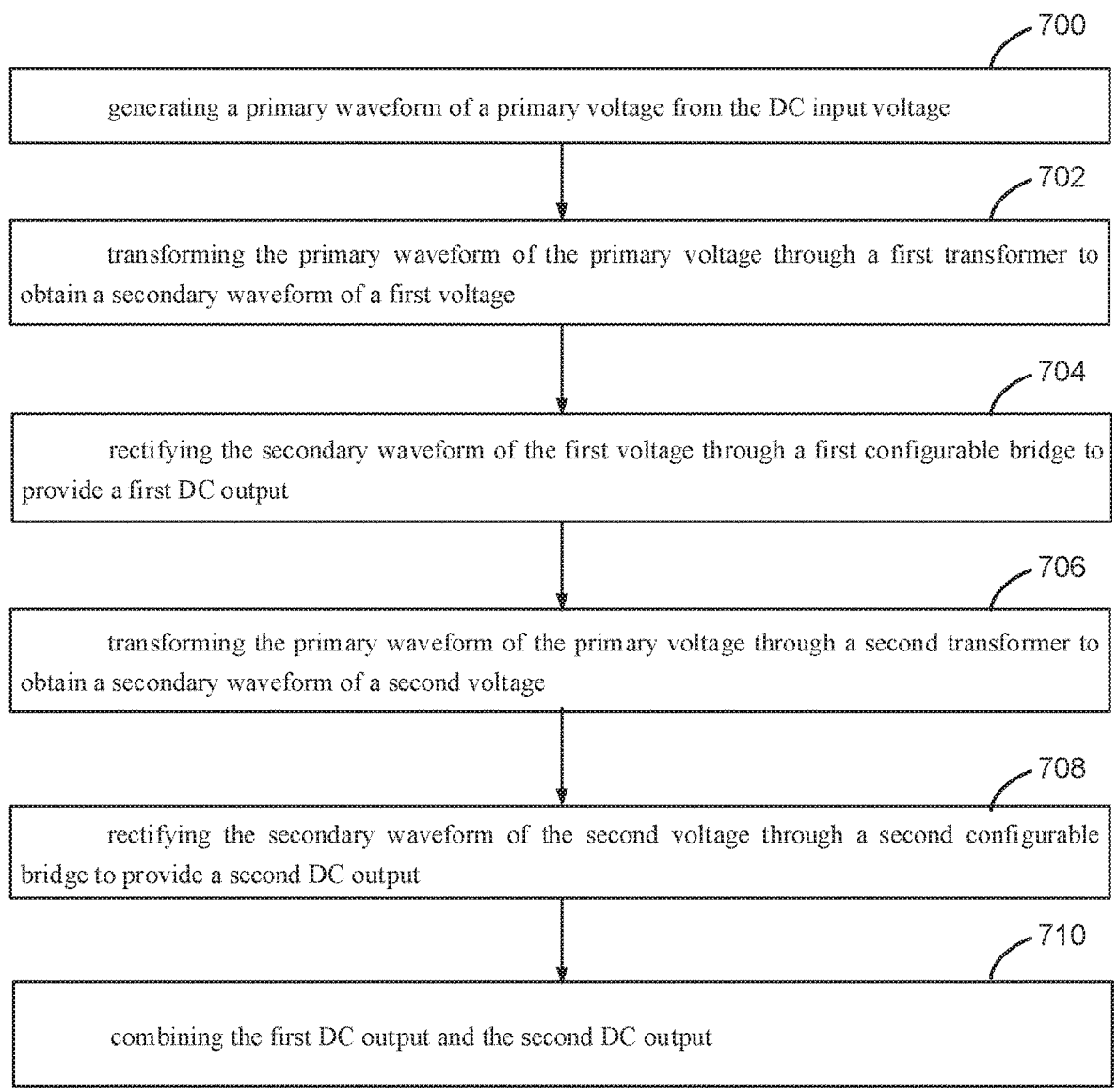
FIG. 7 illustrates an example of a method of implementing the present technology according to one or more embodiments.

FIG. 7 illustrates a method of generating a DC output voltage from a DC input voltage that includes generating a primary waveform of a primary voltage from the DC input voltage in step 700 (e.g. using an appropriate primary circuit, such as LCC), transforming the primary waveform of the primary voltage through a first transformer to obtain a secondary waveform of a first voltage in step 702, and rectifying the secondary waveform of the first voltage through a first configurable bridge to provide a first DC output in step 704 (e.g. using a module as shown in FIG. 2A). The method also includes transforming the primary waveform of the primary voltage through a second transformer to obtain a secondary waveform of a second voltage in step 706 and rectifying the secondary waveform of the second voltage through a second configurable bridge to provide a second DC output in step 708 (e.g. using another module as shown in FIG. 2C). The method further includes combining the first DC output and the second DC output in step 710 (e.g. combining in parallel as shown in FIGS. 2B-C, or in series as shown in FIG. 4B).

A modular voltage converter may be configured in a one-time configuration operation (e.g. in a factory, as part of a manufacturing and/or testing procedure) so that it maintains the same voltage conversion ratio (e.g. Vin:Vout) throughout its operational lifetime. Alternatively, a modular voltage converter may be reconfigured one or more times during its operational lifetime. In some cases, reconfiguration may occur in response to changing conditions, e.g. changing input voltage or output voltage. Thus, as a DC voltage supplied to a modular voltage converter changes (e.g. as a battery discharges, as other loads affect supply voltage, or other effects cause input voltage to change) a modular voltage converter may adjust configuration to maintain output voltage in an output voltage range. An input voltage detection circuit may be provided to monitor input voltage so that appropriate configuration changes can be made. Also, as output voltage changes with different loads, or different requirements, a modular voltage converter may adjust configuration to maintain output voltage in an output voltage range and/or to adjust to a different output voltage range. An output voltage detection circuit may be provided to monitor output voltage so that appropriate configuration changes can be made.

Figure 8:
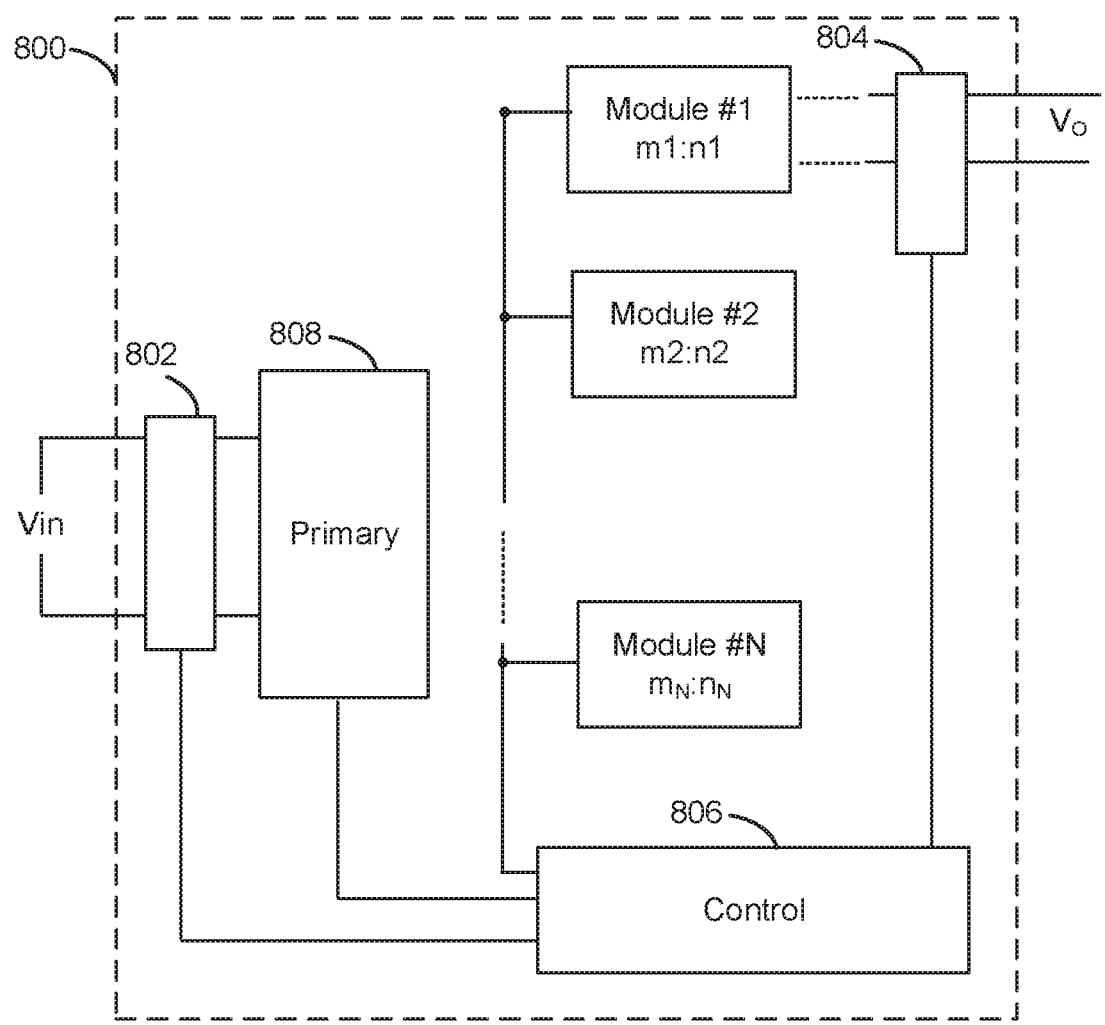
FIG. 8 illustrates an example of a modular voltage converter with input and output voltage monitoring and control circuits.

FIG. 8 illustrates an example of a modular voltage converter 800 that is similar to modular voltage converter 210 of FIGS. 2B-C and modular voltage converter 680 of FIGS. 6A-B) and includes an input voltage detection circuit 802 that is configured to monitor input voltage Vin and an output voltage detection circuit 804 that is configured to monitor output voltage Vo. Outputs of input voltage detection circuit 802 and output voltage detection circuit 804 are provided to control circuit 806. Control circuit 806 is connected to configurable modules (Module #1 to Module # N) so that it can reconfigure modules as needed to obtain a desired ratio (i.e. to maintain Vin:Vo in a desired range). For example, control circuit 806 may cause some bridge elements of some configurable modules to be shorted, to be open, or to be active (e.g. driven at some frequency). Control circuit 806 is also connected to primary circuit 808 and may provide an input that changes configuration of primary circuit 808 (e.g. change in a waveform produced by primary circuit 808). Details of connection between configurable modules #1 to # N are not shown for clarity of illustration and it will be understood that connections may be according to any of the configurations described above, or other suitable configurations. Furthermore, while the example of FIG. 8 shows modules implemented on the secondary side of modular voltage converter 800, voltage detection and control circuits may be implemented in other configurations including those in which modules are implemented on the primary side (e.g. as shown in FIGS. 5A-C).

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

What is claimed is:

1. A DC to DC voltage converter, comprising:
a first voltage converter module including a first bridge that is configurable by controlling bridge elements to generate a first output at a first output voltage selected from two or more different voltages including at least a voltage equal to an alternating current input and a voltage equal to two times the alternating current input;
a second voltage converter module configurable to generate a second output at a second output voltage selected from two or more different voltages including at least two non-zero voltages;
a common input to the first voltage converter module and the second voltage converter module;
a common output combining the first output voltage from the first voltage converter module and the second output voltage from the second voltage converter module; and
a control circuit coupled to bridge elements of the first voltage converter module and bridge elements of the second voltage converter module, the control circuit configured to select the first output voltage by configuring the bridge elements of the first voltage converter module and select the second output voltage by configuring the bridge elements of the second voltage converter module.

2. The DC to DC converter of claim 1 wherein the common input is provided to the first voltage converter module and the second voltage converter module in series and the common output combines the first output voltage from the first voltage converter module and the second output voltage from the second voltage converter module in parallel.

3. The DC to DC converter of claim 1 wherein the common input is provided to the first voltage converter module and the second voltage converter module in parallel and the common output combines the first output from the first voltage converter module and the second output from the second voltage converter module in series.

4. The DC to DC voltage converter of claim 1 wherein the second voltage converter module includes a second bridge that is configurable by controlling elements of the second bridge to generate the second output at two or more different voltages including at least a voltage equal to an alternating current input of the second bridge and a voltage equal to two times the alternating current input of the second bridge.

5. The DC to DC voltage converter of claim 1 wherein the elements of the first bridge are configurable in three modes: a rectifying mode for generating the first output voltage at the voltage equal to the alternating current input, a voltage-doubling mode for generating the first output voltage at the voltage equal to two times the alternating current input, and a shorted mode for generating the first output voltage at substantially zero volts.

6. The DC to DC voltage converter of claim 1 wherein the first voltage converter module contains a first transformer with a first ratio and the second voltage converter module contains a second transformer with a second ratio.

7. The DC to DC voltage converter of claim 6 wherein the first transformer and the second transformer are formed by different secondary windings of a common core having a primary winding coupled to a resonant circuit.

8. The DC to DC voltage converter of claim 1 further comprising at least one of an LLC, LCLC, LCC, full bridge, half bridge, Dual Active Bridge (DAB), or Multi-Level (ML) circuit.

9. The DC to DC voltage converter of claim 1 further comprising at least a third voltage converter module configurable to generate at least a third output at a third output voltage selected from two or more different voltages, the common input is provided to the third voltage converter module, and the common output combines the at least a third output voltage with the first output voltage and the second output voltage.

10. A DC to DC voltage conversion system, comprising:
a plurality of voltage converter modules, each voltage converter module of the plurality of voltage converter modules having a module input connected to a primary winding of a transformer, with a secondary winding of the transformer connected through a configurable bridge to a module output, the configurable bridge configurable by controlling bridge elements to generate an output voltage selected from two or more different voltages including at least a voltage equal to an alternating current input and a voltage equal to two times the alternating current input;

a primary circuit connected to provide an alternating current to module inputs of the plurality of voltage converter modules;

a system output that combines individual output voltages from module outputs of the plurality of voltage converter modules; and a control circuit coupled to bridge elements of the plurality of voltage converter modules, the control circuit configured to select output voltages of each of the plurality of voltage converter modules by configuring the bridge elements of configurable bridges of the plurality of voltage converter modules.

11. The DC to DC voltage conversion system of claim 10 wherein each voltage converter module of the plurality of voltage converter modules contains a transformer with a different transformer ratio.

12. The DC to DC voltage conversion system of claim 10 wherein each voltage converter module has a configurable bridge configurable in three modes: a rectifying mode for generating the output voltage at a voltage equal to the alternating current input, a voltage-doubling mode for generating the output voltage at the voltage equal to two times the alternating current input, and a shorted mode for generating the output voltage at substantially zero volts.

13. The DC to DC voltage conversion system of claim 12 wherein the primary circuit provides the alternating current to module inputs of the plurality of voltage converter modules in series and the system output combines individual output voltages from module outputs of the plurality of voltage converter modules in parallel.

14. The DC to DC voltage conversion system of claim 12 wherein the primary circuit provides the alternating current to module inputs of the plurality of voltage converter modules in parallel and the system output combines individual output voltages from module outputs of the plurality of voltage converter modules in series.

15. A method of generating a DC output voltage from a DC input voltage, comprising:

generating a primary waveform of a primary voltage from the DC input voltage;

transforming the primary waveform of the primary voltage through a first transformer to obtain a secondary waveform of a first voltage;

rectifying the secondary waveform of the first voltage through a first configurable bridge to provide a first DC output, the first configurable bridge configurable to generate the first DC output at a voltage selected from two or more different voltages including at least a voltage equal to an alternating current input and a voltage equal to two times the alternating current input;

selecting the first DC output by a control circuit coupled to bridge elements of the first configurable bridge, the first DC output selected by configuring the bridge elements of the first configurable bridge;

transforming the primary waveform of the primary voltage through a second transformer to obtain a secondary waveform of a second voltage;

rectifying the secondary waveform of the second voltage through a second configurable bridge to provide a second DC output, the second configurable bridge configurable to generate the second DC output at a voltage selected from two or more different voltages including at least a voltage equal to an alternating current input and a voltage equal to two times the alternating current input;

selecting the second DC output by the control circuit coupled to bridge elements of the second configurable bridge, the second DC output selected by configuring the bridge elements of the second configurable bridge; and combining the first DC output and the second DC output.

16. The method of claim 15 further comprising:

configuring the first configurable bridge to operate in one of three modes including: a rectifying mode for generating the first DC output at the voltage equal to the first voltage, a voltage-doubling mode for generating the first DC output at the voltage equal to two times the first voltage, and a shorted mode for generating the first DC output at substantially zero volts; and configuring the second configurable bridge to operate in one of three modes including: a rectifying mode for generating the second DC output at the voltage equal to the second voltage, a voltage-doubling mode for generating the second DC output at the voltage equal to two times the second voltage, and a shorted mode for generating the second DC output at substantially zero volts.

17. The method of claim 16 wherein combining the first DC output and the second DC output includes combining the first DC output and the second DC output in series.

18. The method of claim 15 wherein combining the first DC output and the second DC output includes combining the first DC output and the second DC output in parallel.

19. The method of claim 15 further comprising reconfiguring at least one of the first configurable bridge and the second configurable bridge to change at least one of the first DC output and the second DC output without substantially modifying the primary waveform of the primary voltage.

20. The method of claim 19 further comprising maintaining the primary waveform of the primary voltage in a predetermined frequency range during the reconfiguring, the predetermined frequency range including a resonance frequency of a resonant circuit generating the primary waveform.

* * * * *